US007752657B2

(12) United States Patent
Hagedorn et al.

(10) Patent No.: US 7,752,657 B2
(45) Date of Patent: Jul. 6, 2010

(54) DATA PROCESSING SYSTEM AND METHOD

(75) Inventors: Harald Hagedorn, Wiesloch (DE); Hans-Juergen Wels, Grafendorf (AT)

(73) Assignee: SAP AG, Walldorf (DE)

( * ) Notice: Subject to any disclaimer, the term of this patent is extended or adjusted under 35 U.S.C. 154(b) by 1224 days.

(21) Appl. No.: 10/996,151

(22) Filed: Nov. 22, 2004

(65) Prior Publication Data

US 2006/0075479 A1    Apr. 6, 2006

(30) Foreign Application Priority Data

Oct. 4, 2004    (EP)    ................................. 04023625

(51) Int. Cl.
*G06F 17/00* (2006.01)
(52) U.S. Cl. ...................................................... 726/11
(58) Field of Classification Search .................... 726/11
See application file for complete search history.

(56) References Cited

U.S. PATENT DOCUMENTS

| | | | | |
|---|---|---|---|---|
| 6,000,832 A * | 12/1999 | Franklin et al. | ............. | 700/232 |
| 6,377,993 B1 * | 4/2002 | Brandt et al. | ................ | 709/227 |
| 6,604,197 B1 * | 8/2003 | Lau et al. | ..................... | 713/151 |
| 2001/0037460 A1 * | 11/2001 | Porcari | ........................ | 713/201 |
| 2002/0046253 A1 * | 4/2002 | Uchida et al. | ................ | 709/217 |
| 2002/0051539 A1 * | 5/2002 | Okimoto et al. | ............. | 380/211 |
| 2002/0087447 A1 * | 7/2002 | McDonald et al. | ............ | 705/36 |
| 2002/0091543 A1 * | 7/2002 | Thakur | ........................... | 705/1 |
| 2002/0161733 A1 * | 10/2002 | Grainger | ....................... | 706/45 |
| 2003/0021417 A1 * | 1/2003 | Vasic et al. | .................. | 380/277 |
| 2003/0115334 A1 * | 6/2003 | Bhat et al. | ................... | 709/227 |

FOREIGN PATENT DOCUMENTS

DE    102 13 503 A1    10/2003
EP    1 643 709 B1    4/2007

OTHER PUBLICATIONS

USPTO, "Information Technology Security Program", 2007, found at http://www.uspto.gov/web/offices/com/strat21/action/eg4cio01.htm.*
USPTO, "EFS-Web Overview", 2007 found at http://www.uspto.gov/ebc/portal/efs/efsweb-overview.pdf.*
USPTO, "USPTO Privacy Impact Assessment Statement, Revenue Accounting and Management System" 2006, found at http://www.uspto.gov/web/doc/privacy_pia/pia2006_ram.pdf.*
European Search Report for EP 04 02 3625, dated Mar. 9, 2005, 2 pages.

(Continued)

*Primary Examiner*—Nasser Moazzami
*Assistant Examiner*—Michael S McNally
(74) *Attorney, Agent, or Firm*—Finnegan, Henderson, Farabow, Garrrett & Dunner LLP

(57) ABSTRACT

The present invention relates to a data processing system comprising a computer for receiving data that is uploaded from a data source via a public network through a first firewall a database for receiving the data from the computer through a second firewall, and a data sink for receiving the data from the database via a private network through a third firewall.

5 Claims, 7 Drawing Sheets

OTHER PUBLICATIONS

Metcalfe, A., "PCT-Safe e-filing fully operational at WIPO," *World Patent Information*, 26(3):221-224, Sep. 2004.
Rogier, V., et al., "*epoline* electronic Online Filing (eOLF)," *World Patent Information*, 24(4):277-280, Dec. 2002.
EPO Communication: European Search Report dated Mar. 17, 2005, for EP 04023625.9-1244, SAP-AG, 7 pages.
Response to EPO Communication of Mar. 17, 2005, for EP 04 023 625.9-1244, SAP-AG, dated Jun. 22, 2006, 5 pages.
Metcalfe, Aino, "PCT-Safe e-filing fully operational at WIPO", *Elsevier—World Patent Information* 26 (2004) 221-224.
Rogier, Véronique, et al., "*epoline®* electronic Online Filing (eOLF)", *Pergamon—World Patent Information* 24 (2002) 277-280.

* cited by examiner

DATA PROCESSING SYSTEM AND METHOD

FIELD OF THE INVENTION

The present invention generally relates to the field of data processing and networks, and more particularly to the usage of firewalls for the protection of a private network against unauthorized intrusions.

BACKGROUND AND PRIOR ART

Firewalls are intended to shield data and resources from the potential ravages of computer network intruders. In essence, a firewall functions as a mechanism which monitors and controls the flow of data between two networks. All communications, e.g., data packets, which flow between the networks in either direction must pass through the firewall; otherwise, security is circumvented. The firewall selectively permits the communications to pass from one network to the other, to provide bidirectional security.

Ideally, a firewall would be able to prevent any and all security breaches and attacks. Although absolute security is indeed a goal to be sought after, due to many variables (e.g., physical intrusion into the physical plant) it may be difficult to achieve. However, in many instances, it is of equal if not greater importance to be alerted to an attack so that measures may be taken to thwart the attack or render it harmless, and to avoid future attacks of the same kind. Hence a firewall, in addition to security, often provides timely information that enables attacks to be detected.

Firewalls have typically relied on some combination of two techniques affording network protection: packet filtering and proxy services.

Packet filtering is the action a firewall takes to selectively control the flow of data to and from a network. Packet filters allow or block packets, usually while routing them from one network to another (often from the Internet to an internal network, and vice versa). To accomplish packet filtering, a network administrator establishes a set of rules that specify what types of packets (e.g., those to or from a particular IP address or port) are to be allowed to pass and what types are to be blocked. Packet filtering may occur in a router, in a bridge, or on an individual host computer.

Packet filters are typically configured in a "default permit stance"; i.e., that which is not expressly prohibited is permitted. In order for a packet filter to prohibit potentially harmful traffic, it must know what the constituent packets of that traffic look like. However, it is virtually impossible to catalogue all the various types of potentially harmful packets and to distinguish them from benign packet traffic. The filtering function required to do so is too complex. Hence, while most packet filters may be effective in dealing with the most common types of network security threats, this methodology presents many chinks that an experienced hacker may exploit. The level of security afforded by packet filtering, therefore, leaves much to be desired.

Recently, a further network security technique termed "stateful inspection" has emerged. Stateful inspection performs packet filtering not on the basis of a single packet, but on the basis of some historical window of packets on the same port. Although stateful inspection may enhance the level of security achievable using packet filtering, it is as yet relatively unproven. Furthermore, although an historical window of packets may enable the filter to more accurately identify harmful packets, the filter must still know what it is looking for. Building a filter with sufficient intelligence to deal with the almost infinite variety of possible packets and packet sequences is liable to prove an exceedingly difficult task.

The other principal methodology used in present-day firewalls is proxies. In order to describe prior-art proxy-based firewalls, some further definitions are required. A "node" is an entity that participates in network communications. A subnetwork is a portion of a network, or a physically independent network, that may share network addresses with other portions of the network. An intermediate system is a node that is connected to more than one subnetwork and that has the role of forwarding data from one subnetwork to the other (i.e., a "router").

A proxy is a program, running on an intermediate system, that deals with servers (e.g., Web servers, FTP servers, etc.) on behalf of clients. Clients, e.g. computer applications which are attempting to communicate with a network that is protected by a firewall, send requests for connections to proxy-based intermediate systems. Proxy-based intermediate systems relay approved client requests to target servers and relay answers back to clients.

Proxies require either custom software (i.e., proxy-aware applications) or custom user procedures in order to establish a connection. Using custom software for proxying presents several problems. Appropriate custom client software is often available only for certain platforms, and the software available for a particular platform may not be the software that users prefer. Furthermore, using custom client software, users must perform extra manual configuration to direct the software to contact the proxy on the intermediate system. With the custom procedure approach, the user tells the client to connect to the proxy and then tells the proxy which host to connect to. Typically, the user will first enter the name of a firewall that the user wishes to connect through. The firewall will then prompt the user for the name of the remote host the user wishes to connect to. Although this procedure is relatively simple in the case of a connection that traverses only a single firewall, as network systems grow in complexity, a connection may traverse several firewalls. Establishing a proxied connection in such a situation starts to become a confusing maze, and a significant burden to the user, since the user must know the route the connection is to take.

Furthermore, since proxies must typically prompt the user or the client software for a destination using a specific protocol, they are protocol-specific. Separate proxies are therefore required for each protocol that is to be used.

Another problematic aspect of conventional firewall arrangements, from a security perspective, is the common practice of combining a firewall with other packages on the same computing system. The firewall package itself may be a combination of applications. For example, one well-known firewall is a combination Web server and firewall. In other cases, unrelated services may be hosted on the same computing platform used for the firewall. Such services may include e-mail, Web servers, databases, etc. The provision of applications in addition to the firewall on a computing system provides a path through which a hacker can potentially get around the security provided by the firewall. Combining other applications on the same machine as a firewall also has the result of allowing a greater number of users access to the machine. The likelihood then increases that a user will, deliberately or inadvertently cause a security breach.

The limited security provided by prior art firewalls has also limited applications of data processing systems with respect to sensitive data, such as data that is of a highly confidential nature.

Data security is especially important for protecting patent administration systems, such as electronic patent docketing systems and patent portfolio management systems, against unauthorized intrusions, computer viruses and other forms of sabotage and espionage. Therefore prior art patent administration systems are usually not coupled to public networks, such as the Internet.

It is therefore an object of the present invention to provide an improved data processing system, data processing method and computer program product that enables secure handling of sensitive data, such as confidential data, data that is not publicly accessible and/or or data with restricted access permission, in particular patent-related data.

It is therefore another object of the present invention to provide an improved patent administration system that enables an improved business method for the provision of patent-related services.

SUMMARY OF THE INVENTION

The present invention provides a data processing system that has a computer for receiving data that is uploaded from a data source via a public network through a first firewall.

For example, the computer provides a portal to which data is uploaded from a client computer via the Internet. Preferably, the data is protected against eavesdropping during the Internet transmission by encryption. For example, symmetric encryption of the data is used, such as by means of the secure hyper text transfer protocol (HTTPS). In this case the first firewall is configured such that only transmission via port 443 is enabled. By convention the port 443 is reserved for HTTPS transmissions.

The computer forwards the received data to a database through a second firewall. The database buffers the data before it is sent to a data sink through a third firewall. The data sink can be any node of a private network, such as a database, that is coupled to the private network.

In accordance with a preferred embodiment of the invention, the second firewall is configured such that data transmission is only enabled between the computer and the database. The control of the flow of data packets through the second firewall can be performed on the basis of the Internet protocol (IP) address that is assigned to the computer. In other words, data transmission through the second firewall is only enabled for data packets that are sent from the computer or that are directed towards the computer.

In accordance with a further preferred embodiment of the invention, the computer encrypts the data before transmission to the database through the second firewall. Preferably, an asymmetric encryption procedure is used and the data is encrypted by means of a public key.

In accordance with a further preferred embodiment of the invention the third firewall is configured such that data transmission from the database into the private network is only enabled in response to a request for the data transmission that comes from the private network. This enables to provide a high level of protection of the private network against intrusions and attempts for unauthorized access to the data.

In accordance with a further preferred embodiment of the invention the private network has a network node that is adapted to decrypt the data. That network node can be identical with the data sink or it can be a separate network node. For example, the data sink is a database that is coupled to the private network for access to the data by authorized users of the private network. The decrypted data is stored in the database for convenient access by the authorized users.

The network node that performs the decryption of the data received from the database has access to a private key in order to perform the data decryption. Access to the private key can be protected by a password for increased security of the private key.

In accordance with a further preferred embodiment of the invention, the database has an event log for storing data entry events and data status information. The data status of a data entry event indicates if data is newly received or if the data has already been transmitted to the data sink. In response to a request received from the private network, data entry events that have data status information indicative of the respective data being newly received are identified and the newly received data is retrieved from the database for transmission to the private network. This provides a synchronization mechanism for synchronizing the data sink with the content of the database.

In accordance with a further preferred embodiment of the invention the decrypted data that is stored in the data sink has an assigned confidentiality status information that indicates whether the data is confidential or non-confidential. When the confidentiality status of the data changes from confidential to non-confidential, the data is automatically exported and transmitted to the database via the third firewall. The exported data that is received by the database is accessible through the portal provided by the computer such that a user of the public network can access the non-confidential data.

In accordance with a preferred embodiment of the invention the data is patent data. For example, each data entry comprises an electronic document, such as a PDF document, containing patent application documents and additional meta data, such as the patent application date, priority date, official file number, attorney docket number and/or other meta data. As a patent application is usually published after 18 months from the priority date in most jurisdictions, the confidentiality status of the patent application data changes from confidential to non-confidential after this 18 months period. This change of confidentiality status can be performed automatically by the database that is coupled to the private network such that the respective patent data is exported to the database through the third firewall for access by the portal when it is published.

The present invention is particularly advantageous as it enables providing a high level of security for confidential data while allowing convenient access to the confidential data by authorized users as well as uploading of additional confidential data from outside the private network. The combination of three firewalls with an interposed database buffering the transmission of data to the private network makes it extremely difficult, if not impossible, for intruders to gain unauthorized access to the confidential data via the private network.

In another aspect the present invention relates to a patent administration system. The patent administration system has an interface for receiving patent-related data from a patent law firm. For example, the patent-related data is uploaded from a personal computer of the patent law firm to the patent administration system over the Internet. The uploaded patent-related data is stored automatically in a database of the patent administration system. This has the advantage that the entry of the patent-related data for uploading to the patent administration system can also be outsourced to the patent law firm. The patent-related data can include patent application filing data, patent application prosecution data, patent issuance and/or other procedural information and/or prosecution/issuance cost related and cost data.

In still another aspect the present invention relates to a business method of outsourcing patent work. A company orders an external patent law firm to provide patent work, such as filing a patent application. In response, the patent law firm executes the patent work, e.g. one of the attorneys of the patent law firm prepares and files a patent application. Next, respective patent application related data is uploaded from a computer of the patent law firm to a patent administration system of the company. The patent-related data may include the filing date, priority date if any, the patent office at which the patent application has been filed, the attorney docket number, the client's docket number, the official filing reference issued by patent office and/or other patent-related data. The patent-related data may also include cost related data and cost data, in particular patent drafting, filing, prosecution, issuance, defence and/or maintenance data.

BRIEF DESCRIPTION OF THE DRAWINGS

In the following preferred embodiments of the present invention will be described in greater detail by making reference to the drawings in which.

DETAILED DESCRIPTION

Figure 1:
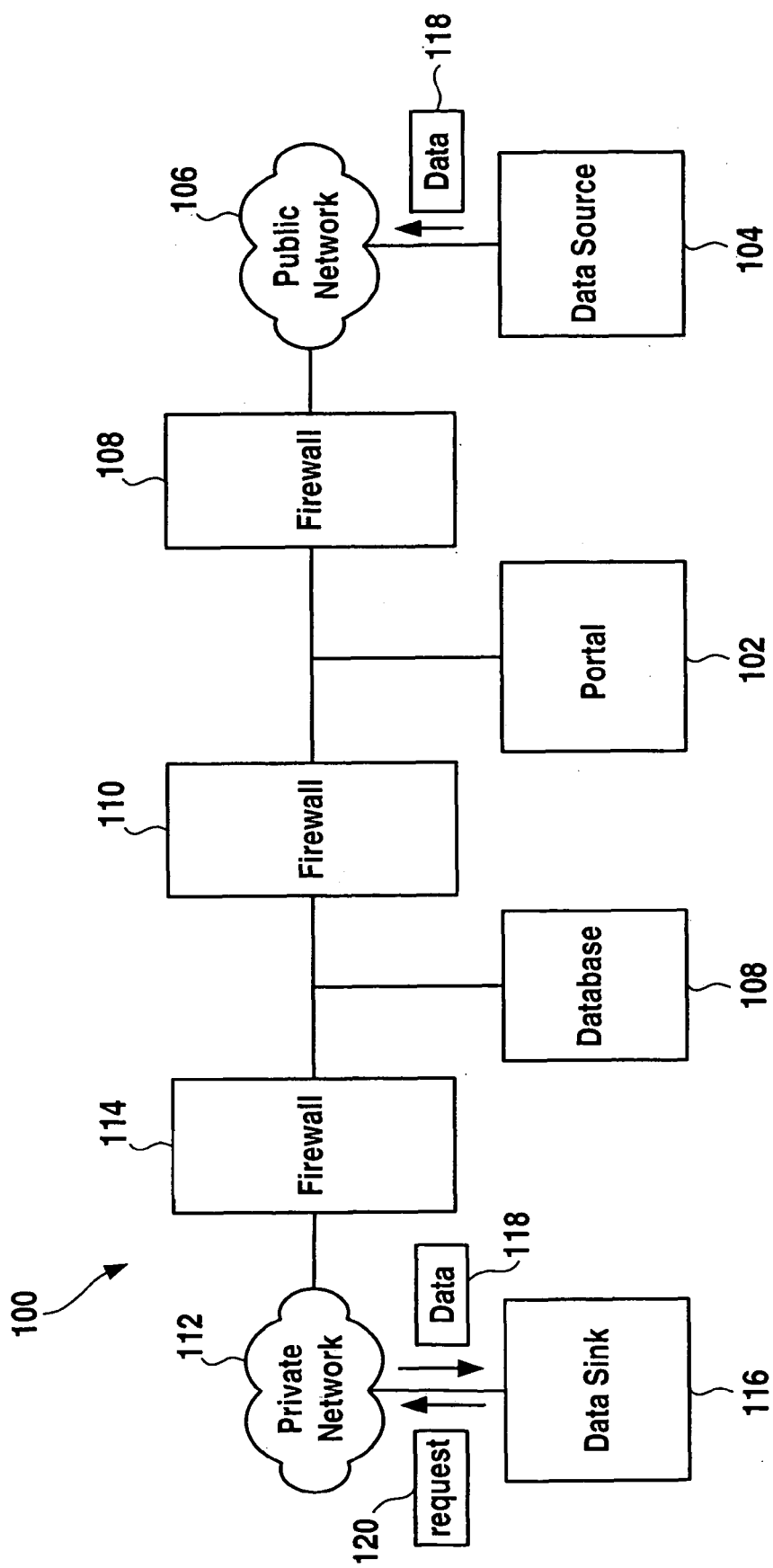
FIG. 1 is a block diagram illustrating a block diagram of a first embodiment of a data processing system of the invention.

FIG. 1 shows a block diagram of a data processing system 100. The data processing system 100 has a portal 102, such as a web-portal, that is accessible by a data source 104 via a public network 106, such as the Internet, through a firewall 108.

The portal 102 is coupled to a database 108 by means of a firewall 110. The database 108 is coupled to a private network 112 through a firewall 114. For example, the private network may be a company intranet. A data sink 116 is coupled to the private network 112.

In operation, data 118 is uploaded from the data source 104 to the portal 102 via the public network 106 through the firewall 108. The portal 102 forwards the data 118 to the database 108 through the firewall 110. The data 118 is stored in the database 108. When the database 108 receives a request 120 from the private network 112, such as from the data sink 116, the database 108 transmits the data 118 to the data sink 116 through the firewall 114 via the private network 112.

The combination of the three firewalls 108, 110 and 114 with the interposed database 108 makes it extremely difficult if not impossible to gain unauthorized access to the data 118 that is received by the private network 112 from the public network 106. Therefore, the data processing system 100 of FIG. 1 is particularly beneficial for handling of data 118 that is of a highly confidential data, such as unpublished patent application data or other trade secret data.

Figure 2:
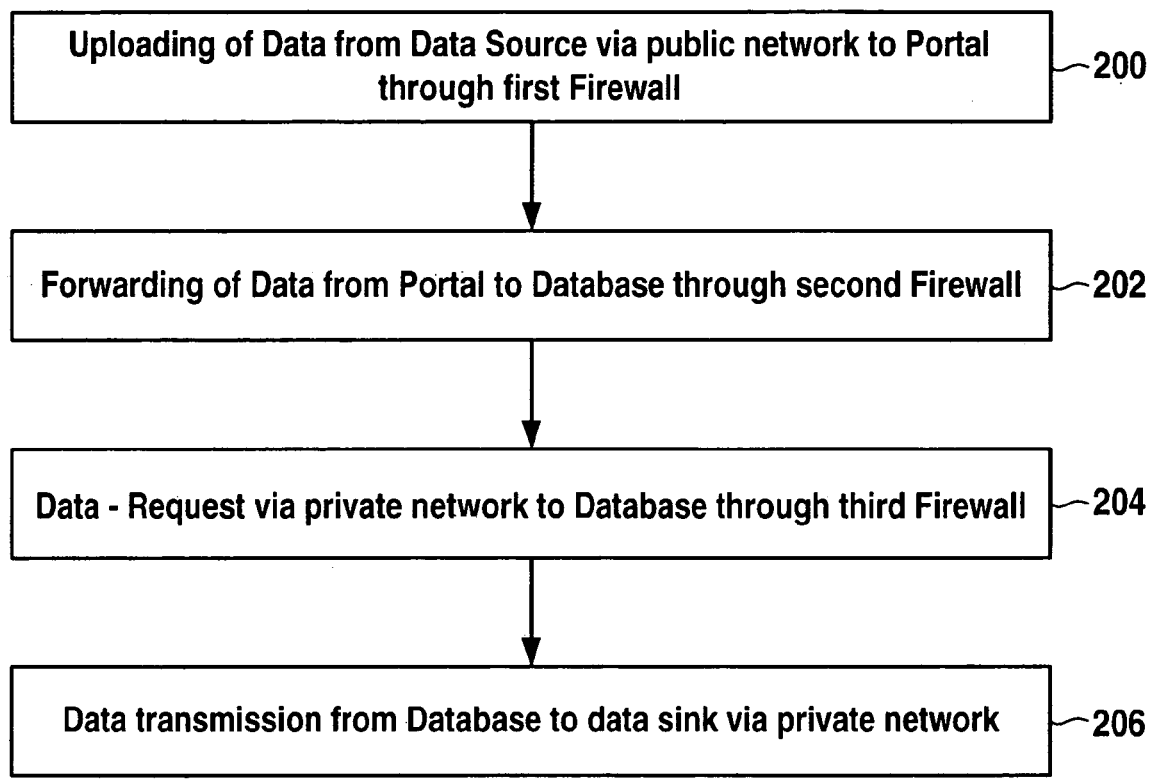
FIG. 2 is a flow chart illustrating a preferred mode of operation of the data processing system of FIG. 1.

FIG. 2 shows a corresponding flow chart. In step 200 the data is uploaded from the data source via a public network to a portal through a first firewall. Typically, the data source is provided by a personal computer that is coupled to the Internet. For example, the data is stored on the hard drive or another storage medium of the personal computer. The personal computer is connected to the portal via the Internet and the data is uploaded from the personal computer to the portal using a web browser, such as Microsoft Explorer or Netscape Navigator.

The uploaded data that is received by the portal is forwarded from the portal to the database through the second firewall (step 202). This data is stored in the database. When the database receives a data request from the private network (step 204), it retrieves the data and sends the data to the data sink of the private network through the third firewall (step 206).

Figure 3:
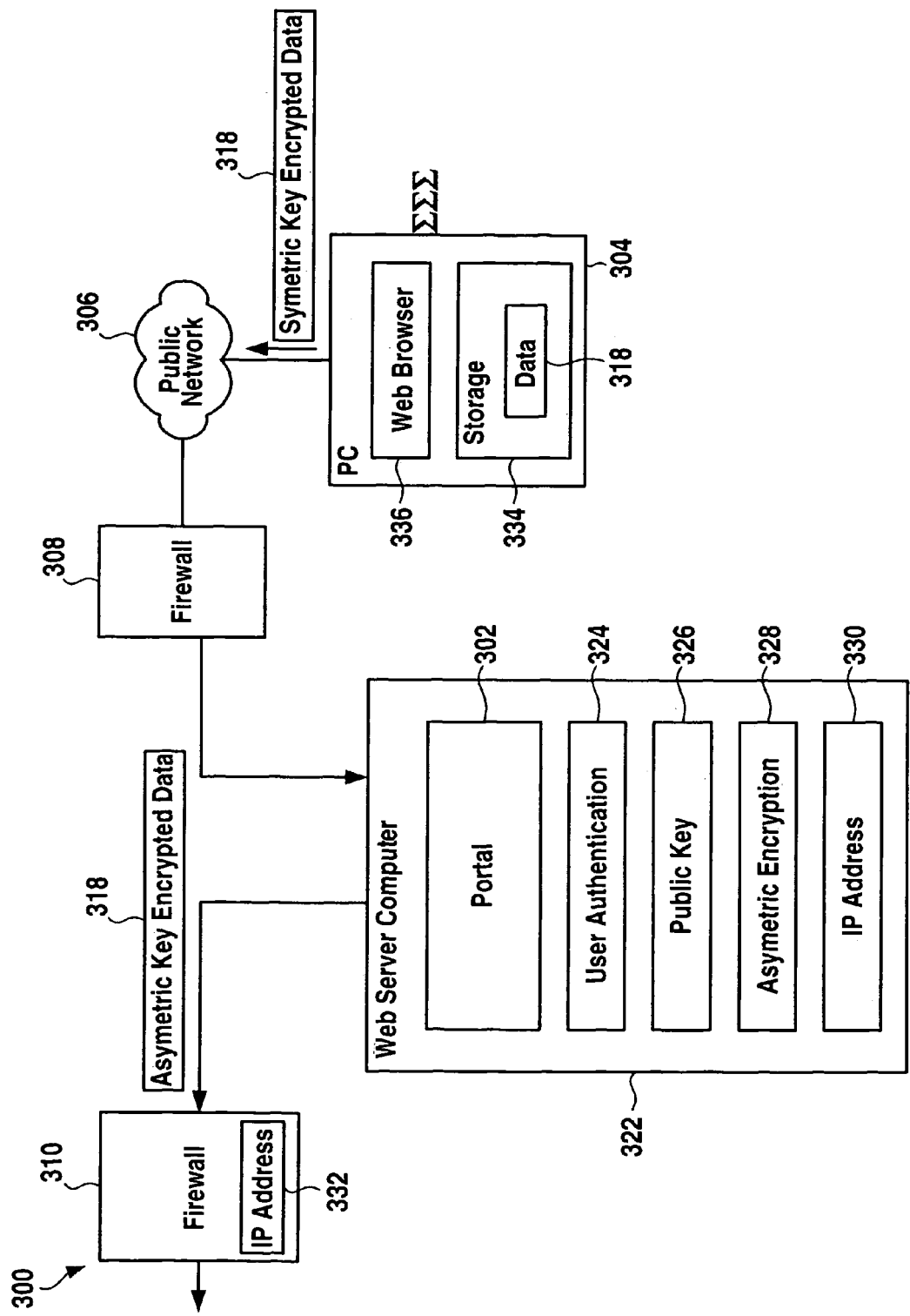
FIG. 3 is a block diagram of a more detailed embodiment of the data processing system of FIG. 1.

FIG. 3 shows a block diagram of a more detailed preferred embodiment of the data processing system. Elements of the data processing system 300 shown in FIG. 3 that correspond to elements of the data processing system 100 of FIG. 1 are designated by like reference numerals.

The web server computer 322 provides a web portal 302 for access by a personal computer 304 via the public network 306 through the firewall 308. The web server computer 322 has a module 324 that serves for user authentication, a module 326 for storage of a public key, a module 328 for performing an asymmetric data encryption using the public key stored in the module 326, and a module 330 for storing an IP address that is assigned to the web server computer 322. The same IP address is also stored in a module 332 of the firewall 310.

The personal computer 304 has storage 334, such as a non-volatile storage device, e.g. a hard disc or optical disc drive, or a volatile storage, such as a main memory, for storage of the data 318. Further, the personal computer 304 has a web browser 336 for coupling the personal computer 304 to the public network 306. A plurality of other personal computers that are similar to personal computer 304 can also be coupled to the public network 306.

In operation a user of the personal computer 304 starts the web browser 336 in order to connect to the web-portal 302 via the public network 306. Next, the user is prompted to enter his or her user ID and password into the web-portal 302. After user authentication by means of module 324, the user is authorized to upload the data 318 into the portal 302. Preferably, the data 318 is protected by encryption to prevent unauthorized access to the data when it is transmitted via the public network 306. For example, the data 318 is encrypted by means of a symmetric key using the secure hyper text transfer protocol (HTTPS) for uploading the data 318 from the personal computer 304 to the web server computer 322.

For example, the firewall 308 is configured such that only encrypted data can be transmitted from the personal computer 304 to the web server computer 322. This can be accomplished by configuring the firewall 308 such that only data transmission via the port 443 that is reserved for the HTTPS transmission is enabled.

After decryption of the data 318 that is uploaded from the personal computer 304 to the web portal 302, the data is encrypted another time using the public key stored in the module 326 by the module 328. The web server computer 322 forwards the data 318 after asymmetric encryption to the database (cf. database 108 of FIG. 1) through the firewall 310. Firewall 310 does not block the data 318 as its originates from a network node having an IP address that matches the IP address that is stored in the module 332 of the firewall 310.

Figure 4:
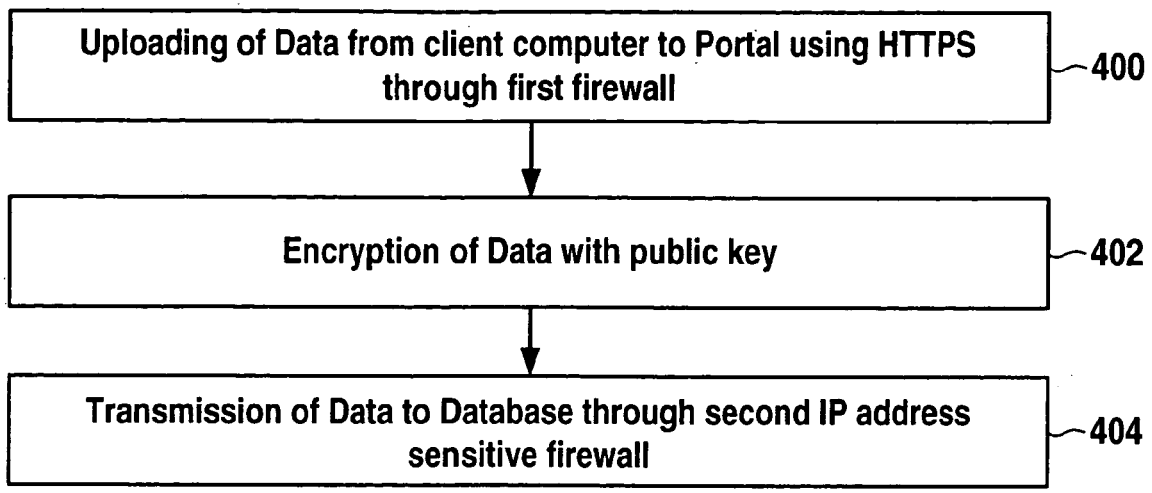
FIG. 4 is a flow chart illustrating a preferred mode of operation of the web server computer of the embodiment of FIG. 3.

FIG. 4 shows a corresponding flow chart. In step 400 data is uploaded from a client computer to the web portal using the HTTPS protocol through a first firewall. The data that is received by the portal is encrypted with a public key (step 402) and then forwarded to a database through a second IP address sensitive firewall (step 404).

Figure 5:
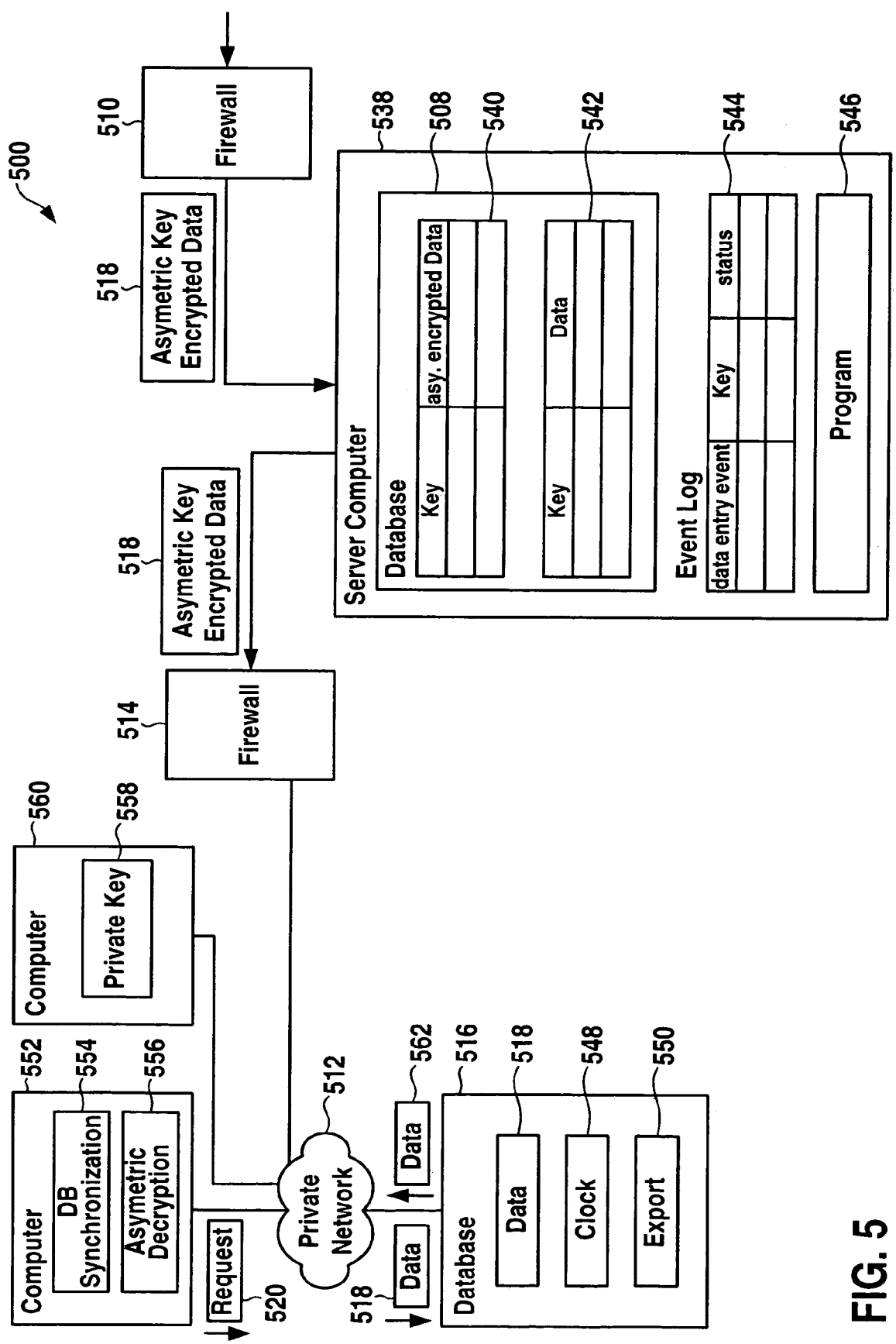
FIG. 5 is a block diagram of a more detailed embodiment of the data processing system of FIG. 1 and/or FIG. 3.

FIG. 5 shows a further more detailed embodiment. Elements of the data processing system 500 shown in FIG. 5 that correspond to elements of the data processing system 100 and/or the data processing system 300 of FIGS. 1 and 3, respectively, are designated by like reference numerals.

In the embodiment considered here, the database 508 is provided by the server computer 538 that is coupled between the firewalls 510 and 514. The database 508 has at least one database table 540 for access to encrypted data 518, that has been received through the firewall 510. Each table entry has an assigned key for access to the data 518 that is stored in the database 508.

Further, the database 508 has at least one database table 542 for storage of unencrypted data. Again each entry has an assigned key for retrieval of the respective data.

The server computer 538 has an event log 544 for storage of data entry events, a database table key of the respective data entry and status information. When data 518 is received by the server computer 538 through the firewall 510, it is stored in the database 508 and the respective entry is made in the database table 540. In addition, the respective data entry event is recorded in the event log 544. The initial status of the data entry event is "newly entered data". After transfer of the respective data entry from the server computer 538 to the database 516 the status changes to "data transferred".

Further, server computer 538 runs a program 546 for the performance of its various data processing tasks.

The database 516 is coupled to the private network 512. The database 516 is used to store the data 518. The database 516 can have a system clock 548 that provides a system time and an export module 540 for exporting data from the database 516.

Further, a computer 552 is coupled to the private network 512. The computer 552 has a module 554 for synchronization of the database 516 with the database 508 and a module 556 for asymmetric decryption of the encrypted data 518 received through the firewall 514. The private key 558 that is required to perform the asymmetric decryption by the module 556 is stored on a computer 560. Alternatively, the functionalities of the computers 552 and/or 560 can be integrated into the database 516.

In operation, the server computer 538 receives the data 518 through the firewall 510. The encrypted data is stored in the database 508 and the respective database entry is created in database table 540. Further, a respective entry is also created in the event log 544 by the program 546.

When the server computer 538 receives the request 520 from the module 554 it determines the data entry events recorded in its event log 544 that have a status. "newly entered data". This data is retrieved from the database 508 and the retrieved data 518 is sent from the server computer 538 to the private network 512 through the firewall 514.

In the preferred embodiment considered here the encrypted data 518 is received by the computer 552 from where the request 520 has originated. The encrypted data 518 is decrypted by means of the module 556. In order to perform the decryption, the module 556 performs an access operation to the computer 560 via the private network 512 in order to read the private key 558. This access operation may require that the module 556 provides a password to the computer 560. Alternatively, the encrypted data 518 is received by the computer 560 where the decryption is performed. This has the advantage that transmission of the private key via the private network 512 can be avoided.

The decrypted data 518 is received by the database 516 where it is stored.

In one application the data 518 has an assigned date. When the date fulfills a certain condition with respect to the system time provided by the system clock 548, the status of the data 518 is changed automatically from confidential to non-confidential. The non-confidential data is then exported from the database 516 by automatically starting the export module 550. The exported data 562 is then transmitted from the database 516 to the server computer 538 through the firewall 514 without encryption. The unencrypted data is stored in the database 508 and the respective table entry is created in the database table 542. The data stored in the database 508 that is identified by the database table 542 is accessible from the portal (cf. portal 102 of FIG. 1 or portal 302 of FIG. 3) for access via the public network (cf. public network 106 of FIG. 1 or public network 306 of FIG. 3).

In one application the data 518 contains a patent application document and related meta data, such as a priority date of the patent application and/or a filing date. Before publication of the patent application document, the data 518 is of a highly confidential nature. Publication of the patent application takes place after 18 months from the filing date or the priority date of the patent application, where applicable, under most jurisdictions. Therefore, the confidentiality status of the data 518 in the database 516 is changed automatically from confidential to non-confidential when the patent application is supposed to be published by the Patent Office as determined by comparing the priority or filing date to the date provided by the system clock.

Alternatively, the change of a document's confidentiality status is event-driven. When an event is entered into the database 516 that indicates publication of the document, this invokes the module 554, i.e. a batch job, in order to transfer the respective data 562 to the server computer 538. For example, if the data 518 contains a patent application document, entry of a publication date or issuance date of the respective patent application triggers a change of the confidentiality status from confidential to non-confidential and transfer of the patent application/patent document from the database 516 to server computer 538.

Further, it is to be noted that the event log 544 can be implemented as an integral part of the database 508. As an alternative to the entry of events into the event log 544 by program 546, the events can be entered from the web-portal 302.

Further, it is to be noted that the computers 552 and 560 can be replaced by a single computer for providing the modules 554, 556 and the private key 558. Preferably the private key 558 is stored on the same computer as the module 554 that provides the batch job. The batch job may require a password for the use of the private key 558 for decrypting the data 518.

Figure 6:
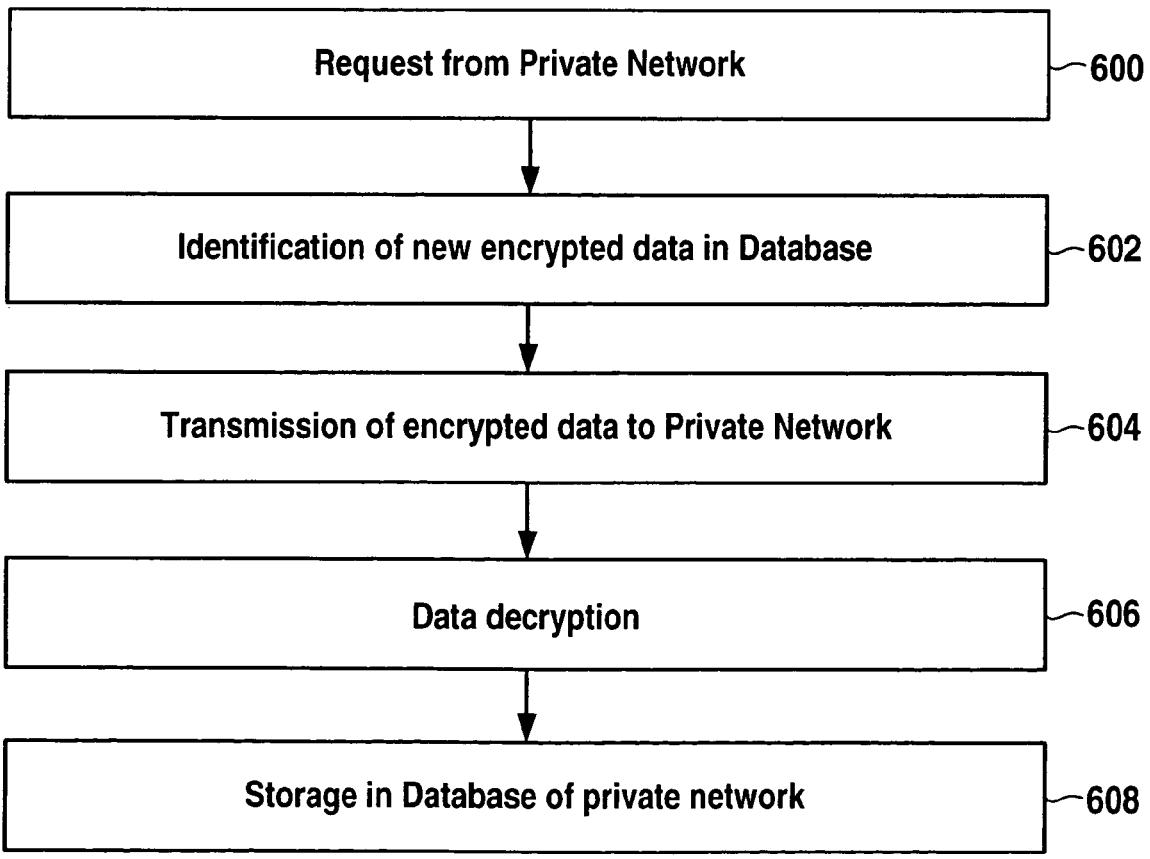
FIG. 6 is a flow diagram illustrating a preferred mode of operation of the embodiment of FIG. 5.

FIG. 6 shows a corresponding flow chart. In step 600 the server computer that is interposed between the second and the third firewall receives a request from the private network through the third firewall. In response the server computer identifies newly received data that has been stored in its database (step 602). This encrypted data is transmitted from the server computer to the private network (step 604) where the data is decrypted in step 606. The decrypted data is stored in the database (cf. data sink 116 of FIG. 1 or database 516 of FIG. 5) in step 608.

The present invention can be used for various applications, especially for such applications involving the handling of confidential data, especially confidential data that changes its confidentiality status over time. In particular, the present invention is advantageous for uploading of patent-related data into a patent administration system.

In one application the private network is operated by a company that relies on one or more external patent law firms for preparing, filing and prosecuting its patent applications. After filing of a patent application the patent application is uploaded from the patent law firm's personal computer to the portal. This can be done by uploading an electronic document containing a copy of the patent application document and related meta data, such as the filing date and/or the priority date. This data is forwarded by the portal and eventually received by the private network for storage in a database coupled to the private network. This way patent-related information can flow in a secure and efficient manner from the external service provider to the corporation for automatic entry of the patent-related data into the company's patent administration system while protecting the patent administration system against intrusions.

Figure 7:
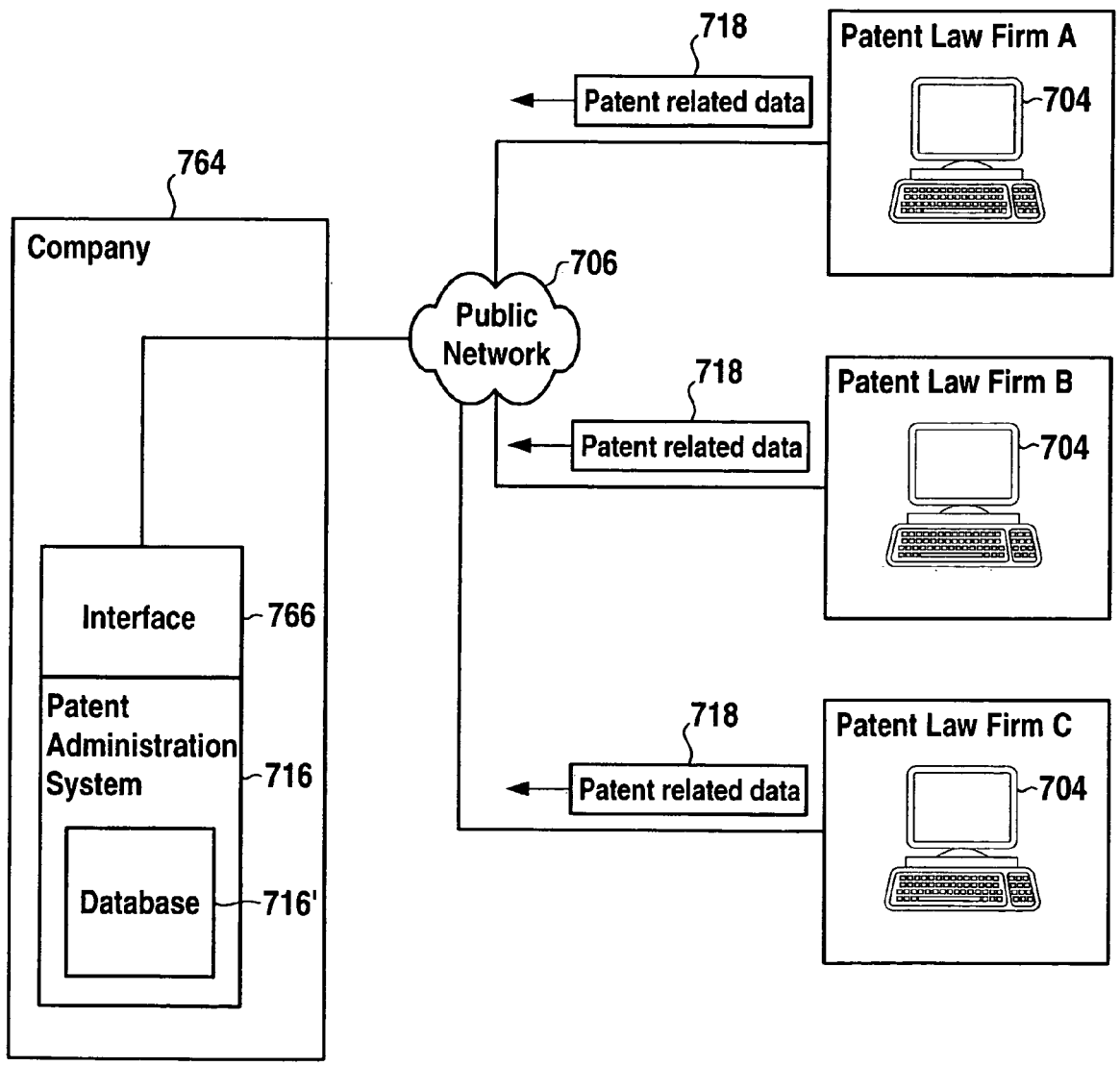
FIG. 7 is a block diagram of a patent administration system for receiving of patent-related data via a public network.

FIG. 7 shows a patent administration system 716 that can receive patent-related data 718 via a public network 706, such as the Internet. Elements of the embodiment shown in FIG. 7 that correspond to elements of the data processing systems of FIGS. 1, 3 and/or 5 are designated by like reference numerals.

The patent administration system 716 is used by a company 764 for collecting the patent-related data 718, including patent application data and/or cost data. The data that is collected in the patent administration system 716 can serve for informational purposes, such as reviewing patent/patent application status information, monitoring of deadlines, such as priority deadlines, and/or for payment of renewal and annuity fees and/or for patent portfolio management purposes.

The patent administration system 716 has a database 716' for storing the patent-related data 718 received by the patent administration system 716. The patent administration system 716 has an interface 766 for receiving the patent-related data via the public network 706. The interface 766 protects the patent administration system 716 and its database 716' against unauthorized intrusions, viruses and/or other unauthorized data entry.

For example, the interface 766 comprises at least one firewall. Preferably the interface 766 comprises an arrangement of up to three firewalls analogous to the embodiments of FIGS. 1, 3 and/or 5.

The company 764 is an international corporation that files a substantial number of patents in various countries. In order to facilitate the patent filing and patent prosecution process the company uses one or more external patent law firm as outsourcing partners for outsourcing at least part of its patent work. The term "patent work" as used herein includes all work items that are related to the filing and prosecution of patents, utility models and/or other protective titles in any country or regional patent office of the world.

In the schematic example considered here, the company 764 has contracted patent law firms A, B and C for providing patent work. For example, patent law firm A is a law firm of U.S. patent attorneys, patent law firm B is a law firm of German patent attorneys and patent law firm C is a law firm of Japanese patent attorneys. In addition, the company 764 may have contracted other patent law firms to provide patent work in other jurisdictions.

Each one of the patent law firms has at least one computer 704 for uploading patent-related data 718 to the patent administration system 716. For this purpose the interface 766 of the patent administration system 716 may provide a web portal as explained with respect to the embodiments of FIGS. 1 to 6.

The term "patent-related data" as understood herein comprises all data that relates to patent work, e.g. patent application filing, prosecution, issuance, priority, inventor, attorney docket number, official file number, client's reference and/or other data and may also include cost data regarding patent work related cost, such as attorney fees, disbursements, travel costs, official fees and/or other cost categories.

In operation, the company 764 orders one of the patent law firms to prepare and file a patent application. For example, the company 764 orders the patent law firm B to file a European patent application for protecting of one of the company's inventions. The order can be sent by regular mail, facsimile, or as an electronic message, such as by email, to the patent law firm B. This can be done manually or by automatically generating the order by the patent administration system 716. In response a patent attorney of the patent law firm B drafts a patent application and files the patent application at the European Patent Office. The patent law firm B receives a filing receipt from the European Patent Office with the filing date and official filing number.

The computer 704 of the patent law firm B is connected to the web portal provided by the interface 766. The patent-related data 718 regarding the new patent application filed by law firm B is entered into a data entry screen provided by the web portal and is uploaded from the computer 704 of the patent law firm B to the patent administration system 716 via the public network 706. The patent administration system 716 stores the patent-related data 718 in its database 716'.

Likewise the company 764 can order the patent law firm A to prepare and file a U.S. patent application. In response the patent law firm A prepares and files the U.S. patent application, such as by electronic filing, and receives a filing receipt from the U.S. Patent and Trademark Office including the filing date and U.S. serial number. The filing date and U.S. serial number is uploaded as patent-related data 718 from the patent law firm A's computer 704 to the patent administration system 716. This can be done manually or automatically.

Figure 8:
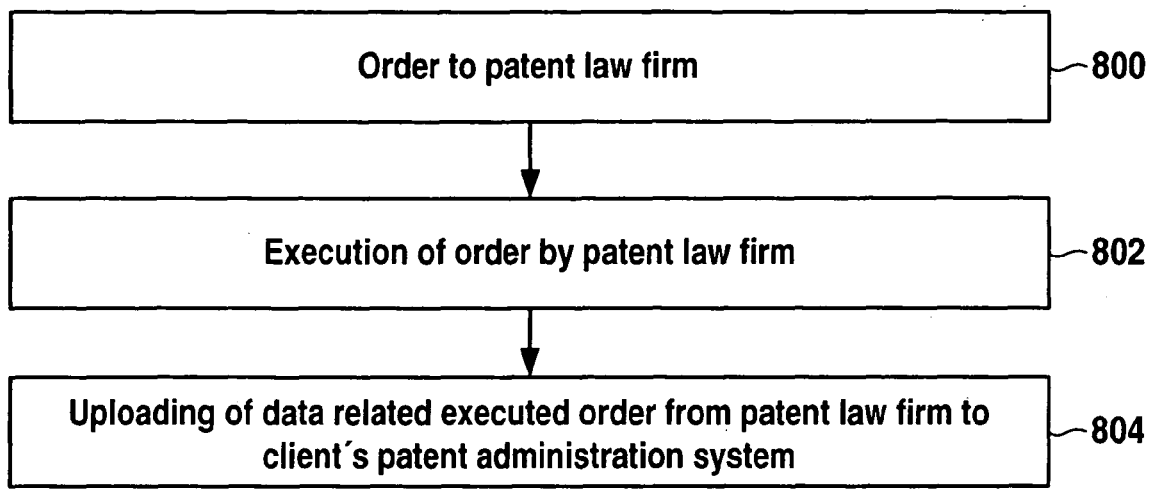
FIG. 8 is a flow diagram illustrating the business method for providing patent work.

FIG. 8 shows a corresponding flowchart. In step 800 the company orders a patent law firm to perform patent work, such as preparing and filing a patent application. In step 802 the patent law firm executes the patent work. This results in patent-related data, such as a patent application filing date and/or patent application cost data. In step 804 the patent-related data that is related to the executed order is uploaded from the patent law firm to its client's patent administration system (cf. patent administration system 716 of FIG. 7).

Figure 9:
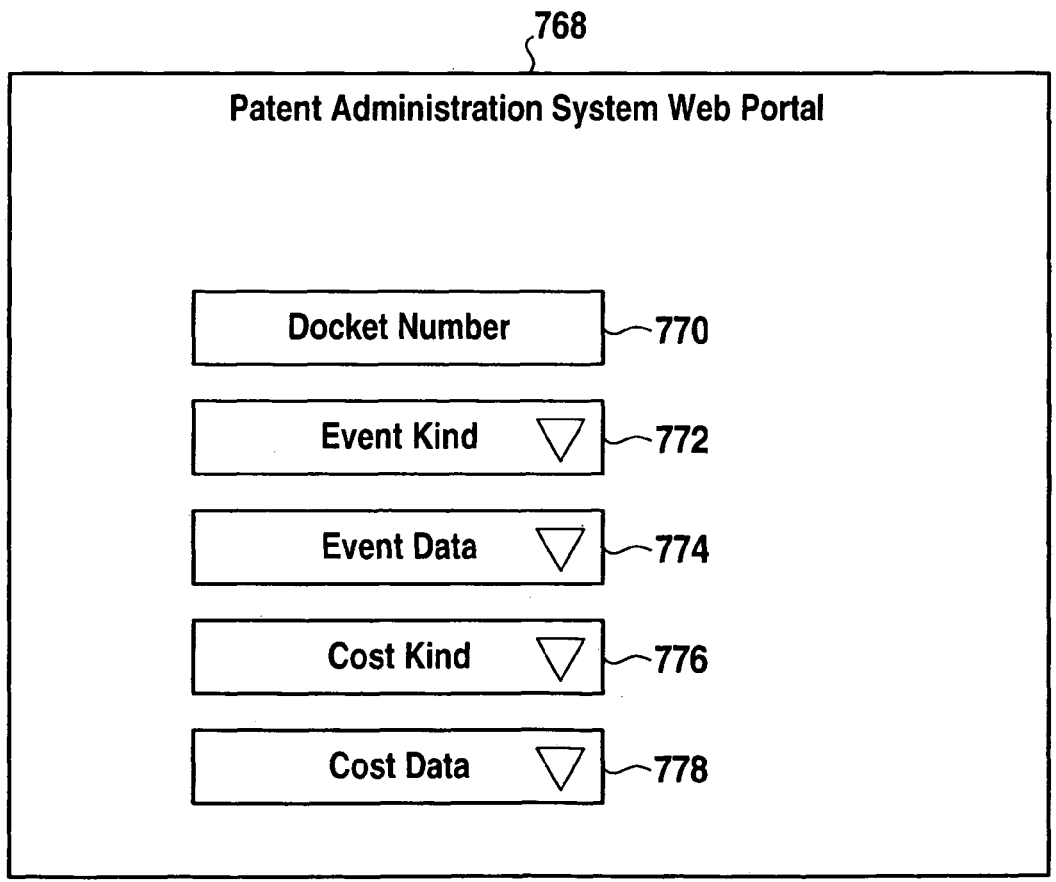
FIG. 9 is a schematic view of an entry window for entry of patent-related data.

FIG. 9 shows a window 768 of a patent administration system web portal provided by the interface 766 of FIG. 7. The window 768 is displayed on the screen of the computer 704 for entry of the patent-related data. The window 768 has data entry fields 770, 772, 774, 776 and 778. The data entry field 770 serves for entering the company's docket number of the patent application or patent for which patent-related data 718 is to be entered. The data entry field 772 is a pull-down menu for selecting an event kind. For example, the pull-down menu can include the following event kind categories: filing of a primary patent application, filing of a secondary patent application claiming priority, filing of a response to an official office action, attending of oral proceedings, filing a notice of appeal and the like.

After selection of one of the event kinds included in the pull-down menu of data entry field 772 respective event data can be entered into the data entry field 774, such as a filing date.

Data entry field 776 has a pull-down menu for selection of a cost kind. The pull-down menu can include typical cost categories such as attorney filing fees, attorney prosecution fees, disbursements, travel expenses, and/or official fees.

After selection of one of the cost clients cost data can be entered into data entry field 778.

What is claimed is:

1. A data processing method comprising:

receiving at a computer from a first firewall an authentication request followed by data packets, wherein the data packets represent encrypted patent data formatted as an electronic document;

storing the encrypted patent data received from a second firewall in a database configured to store data packets received from the computer and transmitted through the second firewall, wherein the database is coupled between the second firewall and a third firewall, and the data packets are decrypted and re-encrypted using asymmetric encryption performed by the computer using a public key prior to being stored in the database;

creating, in response to storing the encrypted patent data in the database, a database entry and an event log entry, wherein the database entry includes the public key and the event log entry includes a status indicating that the re-encrypted patent data is newly received;

retrieving the re-encrypted patent data from the database through the third firewall only in response to a request received from a data sink to access the re-encrypted patent data and when the re-encrypted patent data has a status indicating that the re-encrypted patent data is newly received, wherein the data sink is coupled to a private network; and decrypting the data packets representing the retrieved re-encrypted patent data at the data sink using a private key, wherein the private key and the public key belong to a key pair.

2. The data processing method of claim 1, wherein the first firewall is configured to transmit data packets that are encrypted using a communication protocol that applies a symmetric encryption.

3. The data processing method of claim 2, wherein the communication protocol is a secure hyper text transfer protocol.

4. The data processing method of claim 1, wherein data packet transmission to the database is enabled by the second firewall based on an Internet protocol address that is commonly assigned to the computer and to the second firewall.

5. A non-transitory computer readable medium encoded with a computer program product loadable into a memory of at least one computer, the computer program product comprising instructions for performing the method comprising:

receiving at a computer from a first firewall an authentication request followed by data packets, wherein the data packets represent encrypted patent data formatted as an electronic document;

storing the encrypted patent data received from a second firewall in a database configured to store data packets received from the computer and transmitted through the second firewall, wherein the database is coupled between the second firewall and a third firewall, and the data packets are decrypted and re-encrypted using asymmetric encryption performed by the computer using a public key prior to being stored in the database;

creating, in response to storing the encrypted patent data in the database, a database entry and an event log entry, wherein the database entry includes the public key and the event log entry includes a status indicating that the re-encrypted patent data is newly received;

retrieving the re-encrypted patent data from the database through the third firewall only in response to a request received from a data sink to access the re-encrypted patent data and when the re-encrypted patent data has a status indicating that the re-encrypted patent data is newly received, wherein the data sink is coupled to a private network; and decrypting the data packets representing the retrieved re-encrypted patent data at the data sink using a private key, wherein the private key and the public key belong to a key pair.

\* \* \* \* \*